(12) United States Patent
Fitzgerald

(10) Patent No.: US 8,978,706 B2
(45) Date of Patent: Mar. 17, 2015

(54) PRESSURE REDUCER

(75) Inventor: William V. Fitzgerald, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 97 days.

(21) Appl. No.: 13/369,015

(22) Filed: Feb. 8, 2012

(65) Prior Publication Data
US 2013/0199649 A1 Aug. 8, 2013

(51) Int. Cl.
- G05D 7/01 (2006.01)
- G01F 1/42 (2006.01)
- F16K 47/08 (2006.01)

(52) U.S. Cl.
CPC ................................. *F16K 47/08* (2013.01)
USPC ................................. 138/43; 138/44; 138/45

(58) Field of Classification Search
USPC .............. 138/43–45; 137/625.37, 625.39; 251/118, 127
See application file for complete search history.

(56) References Cited

U.S. PATENT DOCUMENTS 3,931,371 A * 1/1976 Maurer et al. ................ 261/116
6,715,505 B2 4/2004 Higuchi

FOREIGN PATENT DOCUMENTS

DE 2039194 A1 2/1972
GB 2019532 A 10/1979

OTHER PUBLICATIONS

International Search Report for International Application No. PCT/US2013/025010, mailed Apr. 22, 2013.
Written Opinion for International Application No. PCT/US2013/025010, mailed Apr. 22, 2013.
Fisher TBX Steam Conditioning Valve, Product Bulletin 85.1:TBX, p. 1-15, Dec. 2011.
Fisher Rotary Valve Selection Guide, Product Bulletin 40:002, p. 1-15, Nov. 2009.
Emerson Process Management, Control Valve Handbook, Fourth Edition, Chapter 3. Valve and Actuator Types, p. 41-66 (2005).

* cited by examiner

*Primary Examiner* — J. Casimer Jacyna
*Assistant Examiner* — Vishal Pancholi
(74) *Attorney, Agent, or Firm* — Marshall, Gerstein & Borun LLP

(57) ABSTRACT

Pressure reducers are disclosed that, in some embodiments, are designed for use in a pressurized pipe line to provide variable resistance to flow of process fluid, such as steam or water, with no moving parts. The pressure reducers have an elongate outer shell and an inner sleeve spaced radially inwardly from the outer shell. The outer shell is defined by an outer annular wall having an open end and an end wall opposite the open end. The inner sleeve and the outer shell are connected near the open end. The inner sleeve defines a passageway that extends into a cavity defined by the outer shell and has an outlet that is spaced from the end wall. The outer annular wall and the end wall are perforated by a plurality of flow holes extending therethrough, and the sleeve is preferably not perforated.

14 Claims, 7 Drawing Sheets

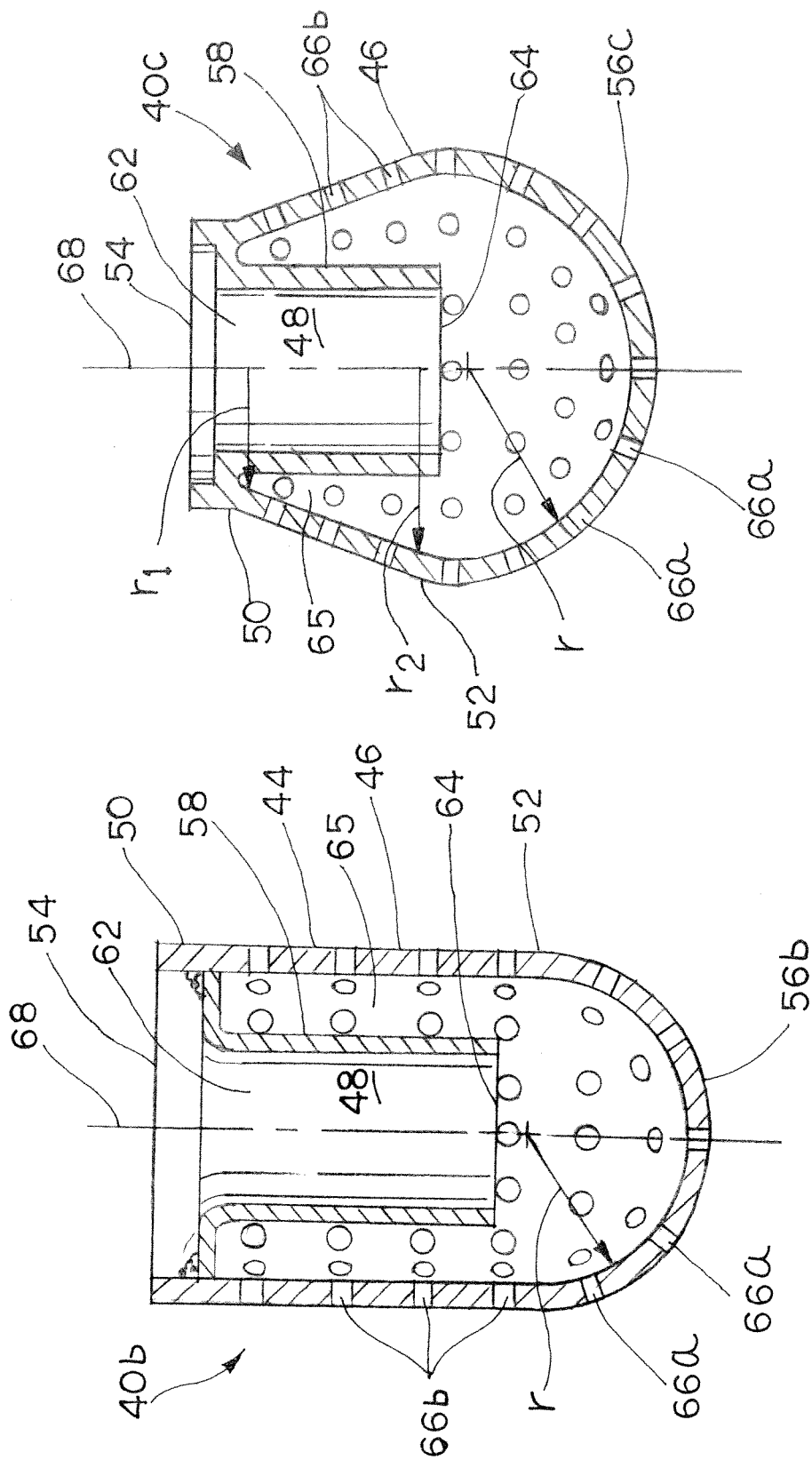

PRESSURE REDUCER

BACKGROUND OF THE INVENTION

1. Field of the Disclosure

The present disclosure relates to pressure reducers suitable for use in pressurized process lines and particularly useful for use in applications in which there is variable flow through the pressure reducer.

2. Description of the Background

Pressure reducers are used in pressurized fluid flow lines, such as process pipe lines in industrial plants, petro chemical refineries, chemical processing lines and the like, to dissipate pressure in a pipe, valve, or discharge outlet in a controlled manner for many various reasons. One common use of a pressure reducer is at an outlet point from a pressurized line to the atmosphere, such as in a high pressure steam line. In this instance, a pressure reducer is often used to avoid releasing steam directly into the surrounding air at a high pressure, which can produce unwanted noise if not controlled because of the rapid pressure drop between the line and the surrounding atmosphere.

A pressure reducer may be as simple as a restriction in a pipe line that is downstream from a valve or other operating point. Downstream restrictions in a pipe line are relatively inexpensive devices that can be used to add an additional pressure drop in a control valve or in a high-pressure pipe line, such as a pressurized steam line, that can reduce noise and vibrations. Unfortunately, fixed restrictions, such as diffusers, are often only effective for creating a desired pressure drop at one application condition (i.e., at a single flow rate and pressure drop) because the flow coefficient (Cv) of the diffuser is fixed. Any attempt to vary the Cv for different flow conditions, until now, has required the addition of complexity and cost by adding, for example, moving parts, such as plugs and springs.

In one exemplary application, a pressure relief outlet from a high pressure steam line is often provided with a conditioning valve to control release of steam from the line and to condition the steam to exhaust at a substantially lower pressure and temperature into the surrounding atmosphere than is present within the line. In such applications, it is also often desirable to reduce or substantially eliminate excess noise, such as whistling or hissing.

FIG. 1 shows one known conditioning valve 10 for a high-pressure steam exhaust that includes a pressure reducer 12 in the form of a canister with a cylindrical sidewall 14 and an end wall 16 covering the valve outlet 18 from a pressure relief valve 20. The end wall 16 is solid, and small holes 22 are disposed through the sidewall 14, which functions to dissipate energy from the steam and reduce the pressure of the steam on a downstream side 24 of the pressure reducer 12. The pressure reducer 12 is surrounded by a shroud 26, which directs the reduced-pressure steam through a cooling section 28 before being exhausted to the surrounding atmosphere. This type of pressure reducer is most effective in applications where there is a relatively constant or set flow rate through the small holes. However, the pressure reducer 12 is generally limited in effective use to one application condition because the pressure reducer only maintains a pre-selected pressure drop over a limited range of flow rates due to the static design of the area of apertures through which the steam can flow.

Another known conditioning valve 30 shown in FIG. 2 overcomes the above-noted limitation on flow volume by adding a plug 32 inside the pressure reducer 12 that is moveable along the sidewall 14 to expose more or fewer of the small holes 22 depending on the volume rate of flow of steam through the valve. A linkage 34 connects the plug 32 with a valve stem 36 such that the plug 32 opens and/or closes in parallel with opening or closing of a main valve plug 38. In this arrangement, the plug 32 is automatically adjusted to cover more of the small holes 22 at lower flow volumes and to expose more of the small holes 22 at higher flow volumes in response to movement of the main valve plug 38. Therefore, a relatively constant pressure drop may be maintained across the pressure reducer 12 across a larger range of flow volumes. Although this is an effective design to increase the effective operating range of the pressure reducer, the addition of moving parts presents different challenges to the design, installation, and maintenance of the conditioning valve 30.

The present inventor has attempted to overcome at least some of the limitations identified above with pressure reducers for use in variable process flow uses, as will become evident from the ensuing description. Of course, other uses, benefits, and advantages may also or alternatively be realized from the apparatus described herein.

SUMMARY

According a one aspect, a pressure reducer for a pressurized pipeline includes an outer shell and an annular sleeve. The outer shell has an annular sidewall and an end wall. The annular sidewall defines an interior space, a first end, and a second end. The first end defines an opening into the interior space, and the end wall is disposed across the second end. The annular sidewall has a first length from the first end to the second end. The annular sleeve extends into the interior space from the first end of the annular sidewall, and has an inlet connected with the first end of the annular sidewall, an outlet disposed within the interior space and spaced from the end wall, and a passageway extending from the inlet to the outlet. The annular sleeve extends into the interior space a second length that is less than the first length. An annular gap surrounds the annular sleeve and is disposed between the annular sidewall and the annular sleeve. A second gap is disposed between the end wall and the outlet of the annular sleeve. There is a first set of apertures through the end wall and a second set of apertures through the annular sidewall. At least a first one of the second set of apertures is located opposite the annular sleeve along the second length.

According to another aspect, a valve assembly for a pressurized pipeline includes a valve and a pressure reducer operatively connected with the valve outlet. The valve has a body defining a passage extending from a valve inlet to a valve outlet, and a flow control member adapted to selectively open and/or close the passage. The pressure reducer includes an outer shell and an annular sleeve. The outer shell has an annular sidewall defining an interior space and an end wall. The annular sidewall has a first end, a second end, and a first length from the first end to the second end. The first end defines an opening into the interior space operatively connected with the valve outlet to receive fluid from the valve outlet, and the end wall is disposed across the second end. The annular sleeve extends into the interior space from the first end of the annular sidewall, and has an inlet connected with the first end of the annular sidewall and an outlet spaced from the end wall. The outlet extends into the interior space a second distance from the first end of the annular sidewall, wherein the second distance is less than the first distance. There is an annular gap between the annular sidewall and the annular sleeve, and an axial gap between the outlet of the annular sleeve and the end wall of the outer shell. There is also a first set of apertures through the end wall, and a second set of apertures through the sidewall. At least a first one of the second set of apertures is disposed opposite the annular sleeve along the second length.

Other aspects and advantages will become apparent upon consideration of the following detailed description.

BRIEF DESCRIPTION OF THE DRAWINGS

FIGS. 6-8 are cross-sectional views of pressure reducers with alternative designs according to the present invention suitable for use with the valve assembly or in the pipe line.

DETAILED DESCRIPTION

Figure 1:
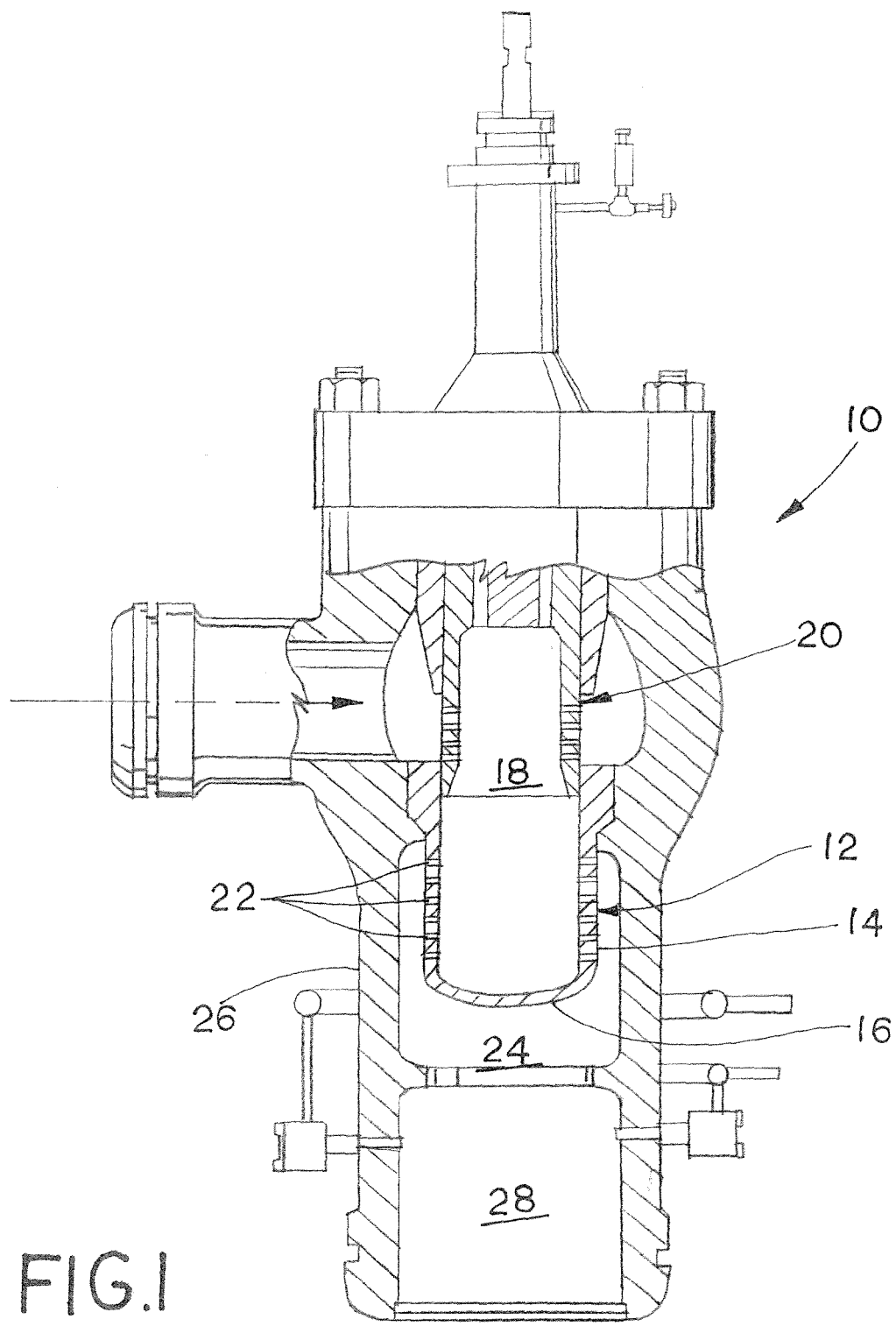
FIG. 1 is a side view in partial cross-section of a prior art pressure reducer in a conditioning valve for use in a steam process pipe line.
Figure 2:
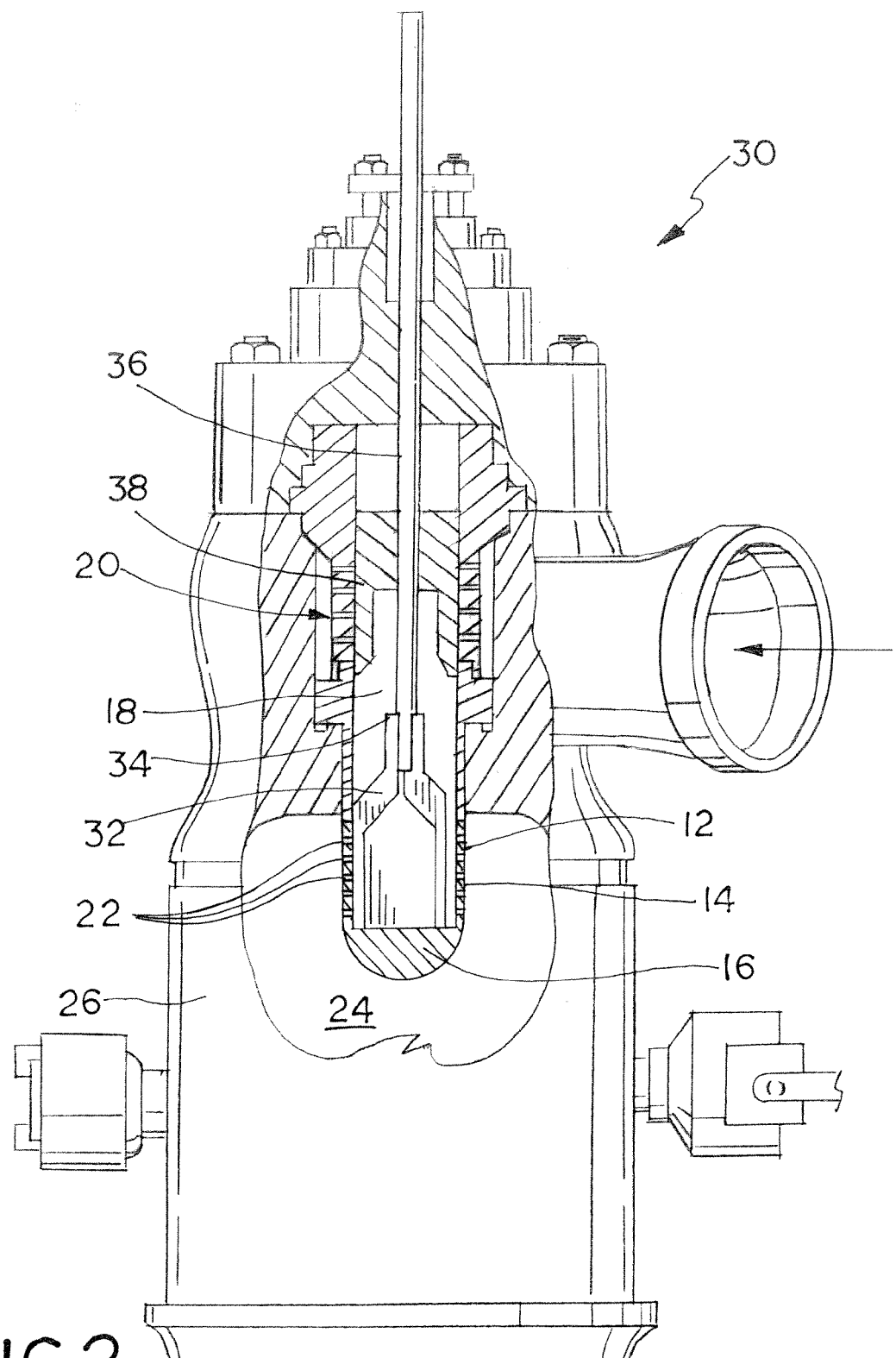
FIG. 2 is a side view in partial cross-section of another prior art pressure reducer in a conditioning valve for use in a steam process pipe line.

In some arrangements, the pressure reducers disclosed herein are designed for use in a pressurized pipe line to provide variable resistance to flow of process fluid, such as steam or water, preferably without any moving parts. The pressure reducers are designed to use inherent fluid dynamics to change the number of flow passages through which the process fluid will flow, which in some instances may maintain a constant pressure drop across the pressure reducer over a relatively broad range of flow rates. Thus, based on the static configuration of the pressure reducer, fluid will flow through fewer flow passages at a lower flow rate and will flow through more flow passages at a higher flow rate, thereby effectively changing the Cv of the pressure reducer in response to a change in flow rate therethrough.

In preferred designs, the pressure reducers have an elongate outer shell defined by an outer peripheral wall having two ends, one end being open on an upstream side and an end wall disposed across the other end on a downstream side. A liner or sleeve is disposed inside the outer shell, spaced radially inwardly from the outer peripheral wall. The sleeve is connected with the outer peripheral wall near the open end and extends from the open end to an outlet that is spaced from the end wall. The sleeve defines a through bore that extends into a cavity defined by the outer shell through the open end of the outer shell. The outer peripheral wall and the end wall are perforated by a plurality of flow holes extending therethrough. The annular wall of the sleeve is preferably not perforated, i.e., the sleeve is formed of a solid annular wall or tube, and there are preferably no flow holes through the outer peripheral wall on the upstream side of the connection between the sleeve and the outer peripheral wall.

At low flow rates, or at a minimum effective flow capacity of the pressure reducer, it is anticipated that most fluid would flow directly through the flow holes through the end wall of the diffuser, and the sleeve would block flow through the flow holes in the outer peripheral wall opposite the sleeve. As the flow rate increases, however, the holes in the end wall would reach capacity, and fluid would be forced to travel back upstream along the outer side of the sleeve and flow through the holes opposite the sleeve. As the flow rate continues to increase, the flow holes would successively reach capacity from the sleeve outlet toward the top of the sleeve and fluid would flow in the reverse direction along the outer peripheral wall opposite the sleeve until all the flow holes reach capacity at a maximum effective flow capacity of the pressure reducer. The fluid flow would reverse commensurately with a decrease from the maximum effective flow capacity back to the minimum effective flow capacity. Thus, the pressure reducer effectively adds system capacity while simultaneously providing a relatively constant staged pressure drop without requiring any moving mechanical parts to vary the capacity of the flow holes because the Cv would change with flow rate.

Figure 3:
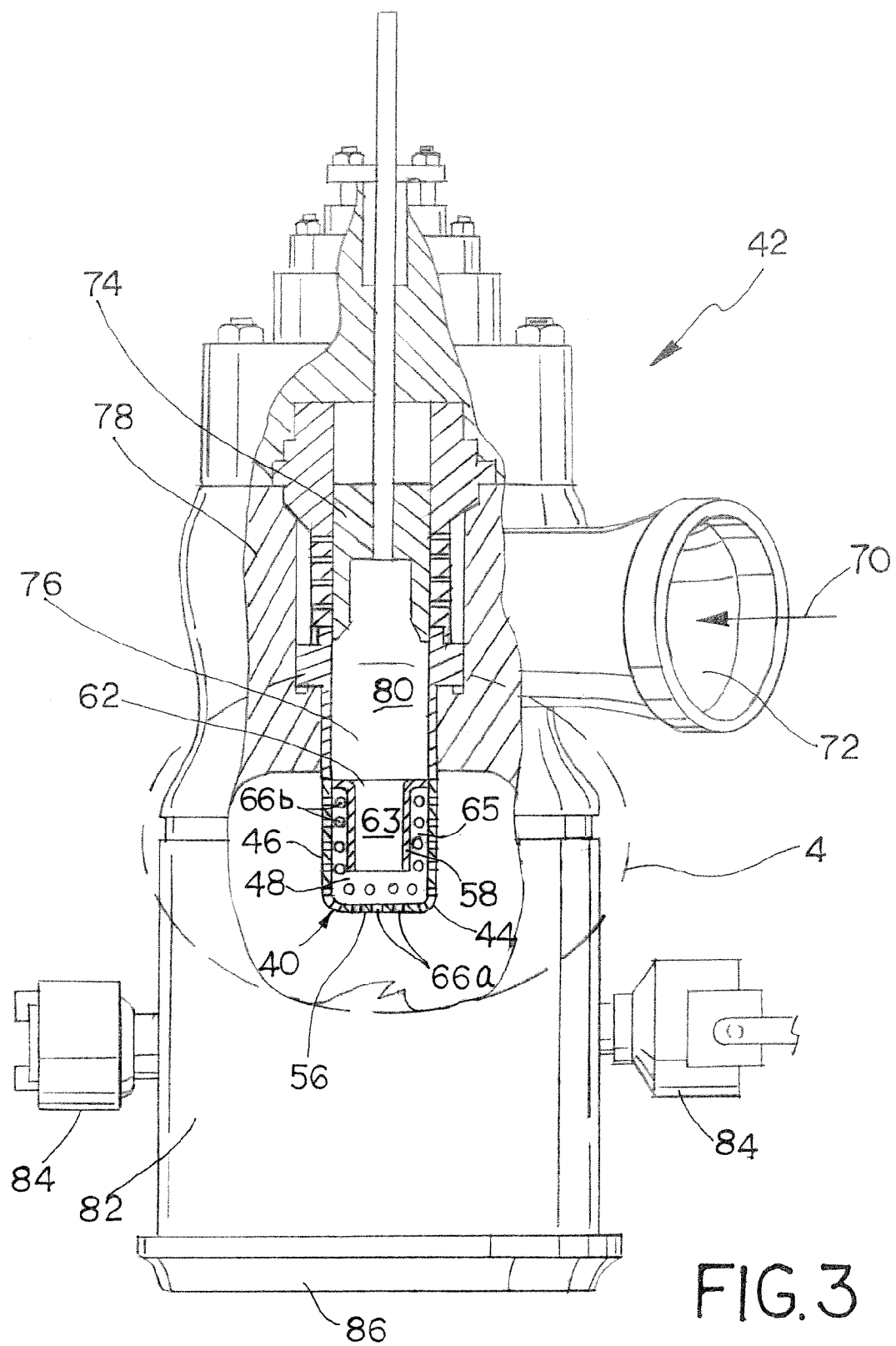
FIG. 3 is a side view in partial cross-section of a valve assembly with a pressure reducer according to principles of the present invention.
Figure 4:
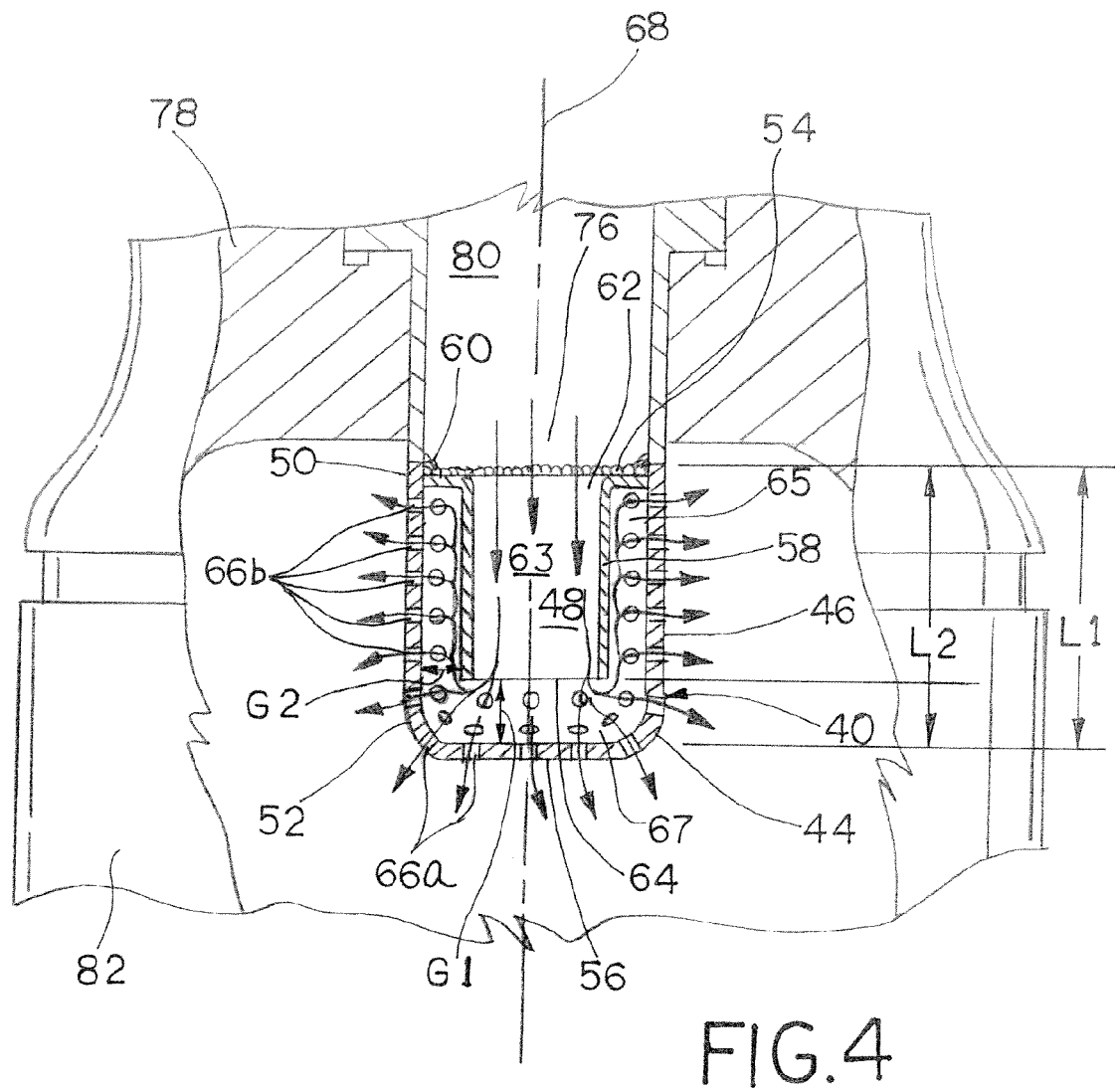
FIG. 4 is a detailed cross-sectional view of the pressure reducer of FIG. 3.

Turning now to the drawings, FIGS. 3-4 show a pressure reducer 40 according to a first aspect. The pressure reducer 40 is suitable for use in a pressurized pipeline, such as a high pressure pipe line or, as shown in the drawings, in a steam conditioning valve 42, or in other applications and positions along a pipe line having a pressure greater than one atmosphere or the general surrounding environmental atmospheric pressure. As best seen in the detail of FIG. 4, the pressure reducer 40 includes an outer shell 44, which preferably has the shape of a cylindrical canister having an annular sidewall 46 that defines an interior space 48, a first end 50 and a second end 52. The first end 50 defines an opening 54 into the interior space, and an end wall 56 is disposed across the second end of the annular sidewall 46. The annular sidewall has a first length L1 extending from the first end 50 to the second end 52.

The pressure reducer 40 also has an inner annular sleeve 58 that extends into the interior space 48 from the first end 50 of the annular sidewall 46. The annular sleeve 58 has an elongate cylindrical body defining an inlet 62, an outlet 64, and a passageway 63, such as a through-bore, extending from the inlet 62 to the outlet 64. The inlet 62 is preferably generally coextensive with the opening 54, and the annular sleeve 58 is preferably connected with the first end 50 of the annular sidewall 46 adjacent the inlet 62. In the depicted arrangement, a flange 60 extends radially outwardly from the cylindrical body at the inlet 62 and is attached to an inner surface or top edge of the annular wall 64 at the first end 50 by, for example, welds, fasteners, and/or adhesive. (All directional references, such as up, down, left, right, etc., are in reference to the drawings for convenience and are not intended as limitations.) However, the inner annular sleeve 58 may be secured in position within the interior space 48 of the outer shell 44 in any arrangement sufficient to direct flow of fluid into the inlet 62 of the annular sleeve 58 in a way that prevents fluid from entering into the outer shell 44 in any path other than going through the annular sleeve 58. The outlet 64 is opposite the inlet 62 along an axis of the passageway and spaced from the end wall 56. The annular sleeve 58 extends into the interior space 48 of the outer shell 44 a second length L2 from the first end 50, which is less than the first length L1, thereby forming an end gap 67 between the outlet 64 and the end wall 56, which may have an axial distance G1 extending from the outlet 64 to the end wall 56 along the axis of the passageway 63. The annular sleeve 58 is also spaced radially inwardly from the annular sidewall 46, thereby forming an annular gap 65 surrounding the annular sleeve 88 between the annular sidewall 46 and the annular sleeve 58. The annular gap 65 preferably has at least a radial distance G2 between the annular sidewall 46 and the annular sleeve 58 sufficient to allow fluid to travel in a counter-flow direction from the outlet 64 in the annular gap 65 between the annular sleeve 58 and the annular sidewall 46 toward the first end 50 of the annular sidewall 46. As will be explained in detail below, the radial distance G2 may be constant along the length L2 or the radial distance G2 may vary along the length L2.

The outer shell 44 is perforated with a first set of apertures 66a or through holes through the end wall 56 and a second set of apertures 66b through the annular sidewall 46. At least one and preferably a plurality of the apertures 66a through the end wall 56 are axially aligned opposite the opening 64 of the annular sleeve 58. Additionally, at least one and preferably a plurality of the apertures 66b through the annular sidewall 46 are disposed along the length L2 radially opposite the annular sleeve 58. Preferably the apertures 66b are located through the annular sidewall 46 radially opposite the annular sleeve 58 along the length L2 at different distances from the outlet 64. In one embodiment the apertures 66b are arranged in circumferential rows spaced axially along the length of the annular sidewall 46 from the second end 52 toward the first end 50; however, the apertures 66a, 66b may be arranged in other arrays or in random arrays, preferably with there being several apertures disposed at different distances axially from the outlet 64 along the annular sidewall 46 opposite the annular sleeve 58.

Preferably, the annular sidewall 46 and the annular sleeve 58 are arranged to force fluid to flow through the outlet 64 before passing through the outer shell 44. The annular sleeve 58 is preferably not perforated, i.e., is solid, along its entire length. Further, any portion of the annular sidewall 46 that extends upstream of the connection of the annular sleeve 58 to the annular sidewall 46 also is not perforated in order to prevent fluid from passing through the annular sidewall 46 prior to passing through the annular sleeve 58.

The pressure reducer 40 as shown in FIGS. 3-4, preferably has a circular cross-section and forms a circular cylindrical outer shell 44, a circular cylindrical annular sleeve 58, and the annular sleeve 58 is coaxial with the annular sidewall 46 along a longitudinal axis 68. In this embodiment, the annular sleeve 58 is parallel with the annular sidewall 46. However, as will be described in more detail herein after, other shapes may be used for the pressure reducer 40 according to the present disclosure. As also best seen in FIG. 4, the end wall 56 has a generally flat form orthogonal to the axis 68 with a gentle curvature or rounded corner between the flat surface of the end wall 56 and the cylindrical surface of the annular sidewall 46.

In operation, as pressurized fluid 70 flows through a valve inlet 72 and through the valve 42, a valve plug 74 can allow variable flow rate from a fully closed position, where there is no flow, to a fully opened position, where there is full flow through the valve 42, and out a valve outlet 76. The first end 50 of the annular sidewall 46 is attached to the valve outlet 76 such that pressurized fluid, such as steam exiting the valve, is necessarily directed through the opening 54 and the inlet 62 and through the pressure reducer 40. Without being bound by theory, it is believed that at a low rate of flow, the pressurized fluid flows through the annular sleeve 58, out the outlet 64, and directly through the first set of apertures 66a through the end wall 56 of the outer shell 44 without any substantial amount of the fluid flowing back along the annular wall 46 and out any of the second set of apertures 66b. As the flow rate increases and the first set of apertures 66a reaches flow capacity, excess pressurized fluid will travel in counter or reverse current up along the annular gap 65 between the annular sleeve 58 and the annular sidewall 46 toward the first end 50 and progressively flow through the apertures 66b through the annular sidewall 46. As the flow rate for the pressure reducer 40 continues to increase, the excess pressurized fluid will travel further and further along the annular gap 65 from the outlet 64 back toward the first end 50 until all of the apertures 66b through the outer shell 44 have reached capacity. Thereafter as the flow rate through the pressure reducer 40 reduces, the flow of pressurized fluid will also retreat back downwardly along the annular gap 65 such that fluid would cease flowing through the apertures 66b spaced most distant from first and then fluid would cease flowing through the next furthest aperture, and so on, until the fluid would again flow substantially only through the apertures 66a.

The valve assembly shown in FIG. 3 is the conditioning valve 42; however, the pressure reducer 40 may be used with other valve assemblies equally well. The conditioning valve 42 includes a valve body 78 which defines a fluid flow passage 80 that extends from the valve inlet 72 to the valve outlet 76. A flow control member, such as the plug 74, is adapted to selectively open and/or close the fluid flow passage 80 in any sufficient manner. The conditioning valve 42 preferably also includes a cooling shroud 82 surrounding and extending beyond a distal end of the pressure reducer 40. The conditioning valve 42 also preferably includes one or more spray water manifolds 84 extending into the cooling shroud 82 and arranged to spray water in a mist into a cavity inside the cooling shroud that is in fluid communication with the pressure reducer 40. Thus as steam, for example, passes through the conditioning valve 42 and the pressure reducer 40, the steam will then subsequently pass through the cooling shroud 82 and be cooled by a mist of water from the spray water manifolds 84 before being exhausted out an exhaust opening 86.

Figure 5:
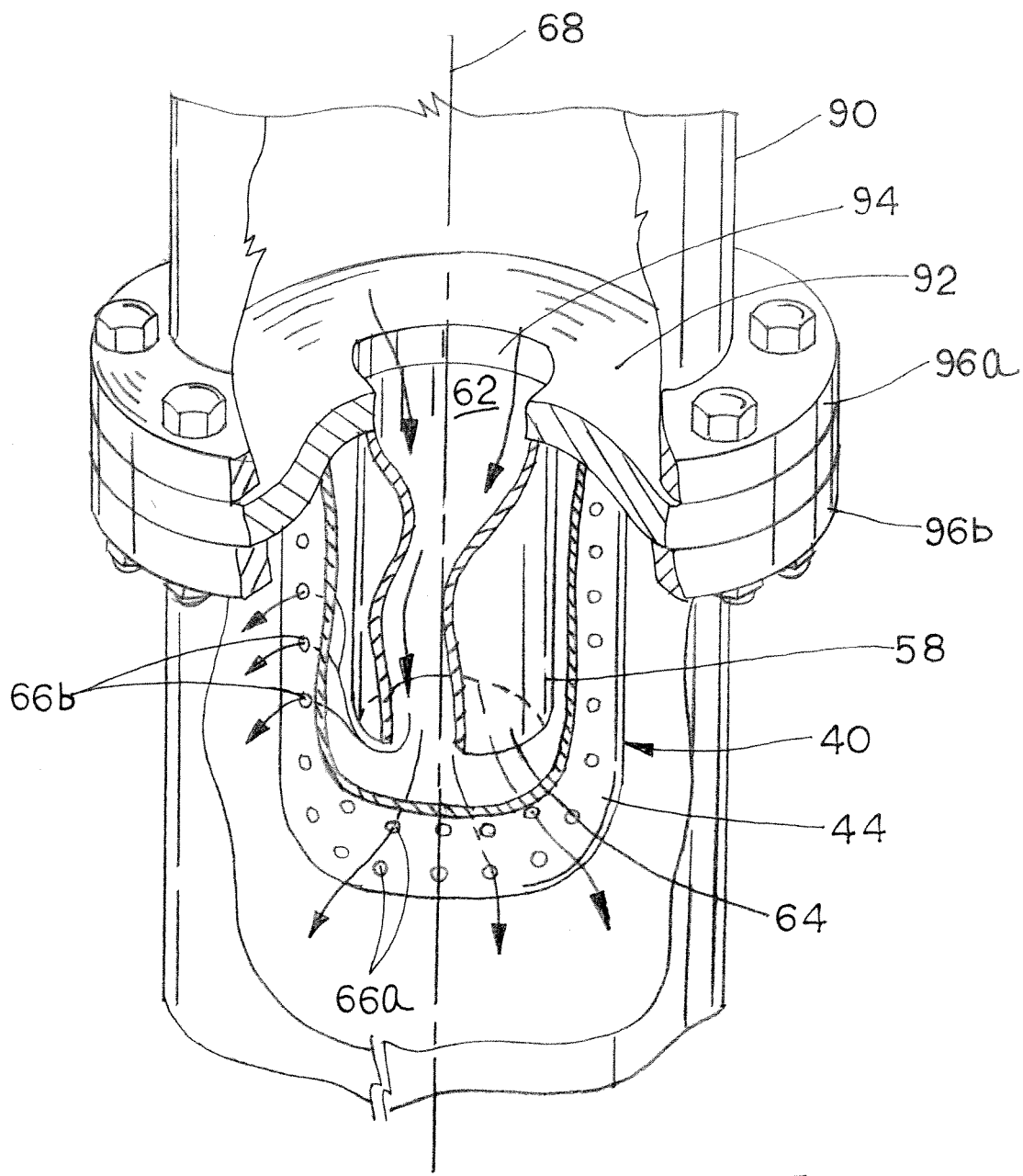
FIG. 5 is a cross-sectional view of the pressure reducer adapted for stand-alone use in a pipe line.

Turning now to FIG. 5, the pressure reducer 40 is shown adapted for use along a pipe line 90 remote from a valve. In this environment, the pressure reducer 40 is secured to a flange 92 with a central flow hole 94 therethrough. The flange 92 is adapted to be secured between opposing pipe section flanges 96a, 96b in a manner well understood in the art. The flow hole 94 is aligned with the inlet 62 of the inner annular sleeve 58 and arranged such that pressurized fluid flow from an upstream side of the pipe line will flow through the flow hole 94, through the inner annular sleeve 58 and out the outlet 64, and from there, through the apertures 66a, 66b to a downstream side of the pressure reducer 40 in a manner as described previously. Other portions of the pressure reducer 40 are substantially identical to those previously described and will not be repeated herein for sake of brevity.

In either of the exemplary use environments shown in FIGS. 3-5, the pipe section 90 and/or shroud 82 surrounding the pressure reducer 40 is spaced radially outwardly from the annular sidewall 46 a distance to provide an annular gap sufficient to allow the fluid flowing through the apertures 66a, 66b to travel through an annular space or gap therebetween and on downstream.

Figure 6:
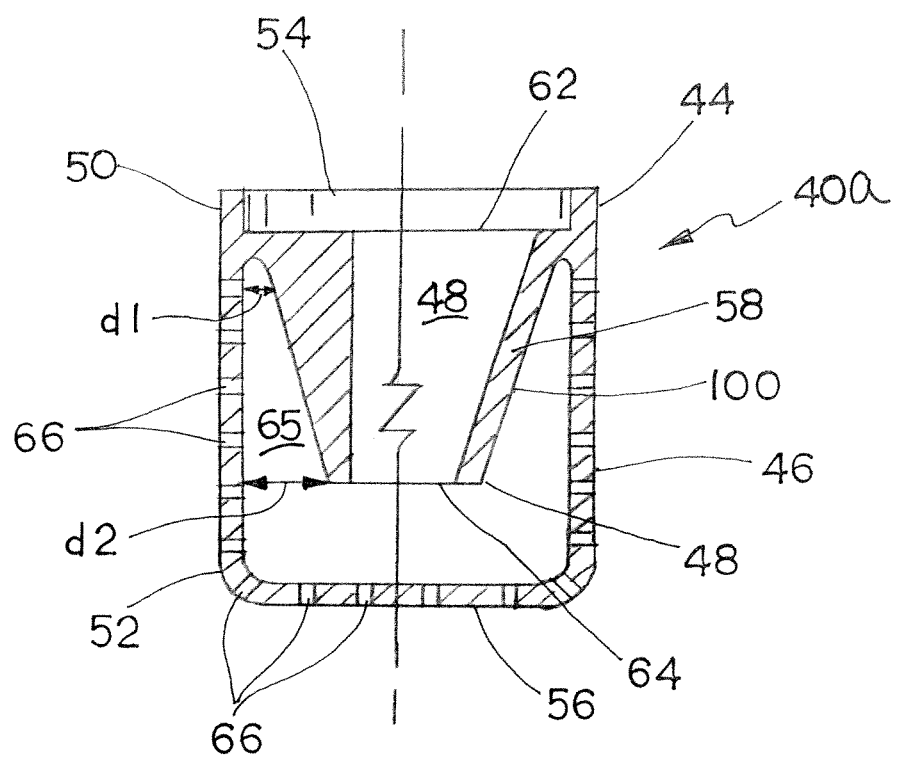

FIG. 6 shows a slightly modified design of a pressure reducer 40a. The pressure reducer 40a is substantially similar to the pressure reducer 40, except that the inner annular sleeve 58 has at least a tapered outer annular surface 100 such that the annular sleeve 58 is radially spaced from the annular sidewall 46, a first distance d1 adjacent the inlet 62 and spaced a second distance d2, which is larger than the first distance d2, at the outlet 64. Thus, in this arrangement the annular gap 65 defined between annular sleeve 58 and the annular sidewall 46 is tapered to become narrower as fluid travels in reverse direction from the outlet 64 back toward the first end 50 of the annular sidewall 46. As shown on the right half of FIG. 6, the tapered annular gap 65 may be formed with a conical shaped annular sleeve 58 such that the inner diameter of the sleeve is also tapered as well as the outer diameter of the sleeve; however, other shapes may also be used. For example, as shown on the left side of FIG. 6, the sleeve 58 may have a cross-sectional shape such that the inner diameter of the sleeve is substantially constant along the length of the sleeve and the outer diameter is continually changing.

Turning now to FIG. 7, another pressure reducer 40b includes an outer shell 44 having an annular sidewall 46 defining an interior space 48, a first end 50 and a second end 52, and an inner annular sleeve 58, which is non-perforated, extending into the interior space 48 from the first end 50 and spaced radially inwardly from the annular sidewall 46. All this is substantially similar to the pressure reducer 40 as previously described. A difference from the pressure reducer 40, however, is that the pressure reducer 40b includes an end wall 56b disposed across the second end 52 of the annular sidewall 46, in which the end wall 56b is hemispherical in shape, having a single radius r, which also corresponds to the radius of the annular sidewall 46. A plurality of apertures 66a, 66b are defined through the outer shell 44 in the annular sidewall 46 and the end wall 56b similarly as with the pressure reducer 40. The pressure reducer 40b functions in substantially the same manner as described herein with respect to the pressure reducer 40.

Turning now to FIG. 8, a further variation is disclosed with a pressure reducer 40c, in which the annular gap 65 between the annular sleeve 58 and the annular sidewall 46 is tapered from a widest point at the outlet 64 of the sleeve 58 to a narrowest point adjacent the first end 50 of the sidewall by tapering the annular sidewall 46 rather than the outer surface of the annular sleeve 58. Further, the end wall 56b is in the form of a hemisphere having a radius r, similar to the pressure reducer 40b of FIG. 7. In this variation, the annular sidewall 46 preferably has the shape of a frustoconical section having a first radius r1 from a longitudinal axis 68 at the first end 50 and a second radius r2 at the second end 52, wherein the radius r2 is larger than the radius r1. The pressure reducer 40c also includes a plurality of apertures 66a, 66b disposed through the outer shell 44 in both the annular sidewall 46 and the end wall 56c. The pressure reducer 40c functions similarly as previously described herein with respect to the pressure reducer 40. Each pressure reducer 40a and pressure reducer 40c has a tapered annular gap 65, which goes from a wider dimension adjacent the outlet 64 to a narrower dimension near the first end 50 of the annular sidewall 46, and that this tapered annular gap affects the fluid dynamics and the variation in the flow coefficient Cv of the pressure reducers.

The exemplary shapes of the outer shell 44 and the inner annular sleeve 58 described with respect to the detailed drawings may be modified in many different ways within the principals of the disclosure. For example, although the pressure reducers disclosed herein are generally axially aligned along a single axis and are substantially circular in cross-section such as having a circular cylindrical or circular conical shape, the disclosure is not limited to such shapes and regular geometries. Thus, for example, a pressure reducer according to the general principles of the present disclosure may have an inner annular sleeve that is not coaxial with the outer shell, or the pressure reducer may have a non-circular cross-sectional shape such as an oval, a square, or other polygon, and, other non-regular geometric shapes are also within the general principles of the present disclosure.

The pressure reducers disclosed herein may be made of any suitable material, such as, steel or stainless steel, that may be assembled with appropriate welding or other connection mechanisms known in the art. The apertures may be formed in any convenient manner, such as by drilling or by casting. The pressure reducers disclosed herein may be any convenient size and have different dimensions depending upon the particular application. One anticipated application for the pressure reducers disclosed herein would be in industrial pipe line applications, and dimensions in sizing would be adapted appropriately for use in such pipe lines and valves.

Without being bound by theory, it is believed that, unlike prior known pressure reducers, in some arrangements the pressure reducers disclosed herein may provide a variable effective restriction area through which the pressurized fluid will flow depending upon the volume of flow through the pressure reducer without the use of any moving parts. Thus, it is further believed without being bound by theory that in some arrangements the effective Cv of the pressure reducers may change in response to variations in the fluid flow without requiring any moving parts, but rather dependent solely on the fluid dynamics through the pressure reducers.

Industrial Applicability

The pressure reducers disclosed herein are particularly well suited as a variable downstream restriction for applications, such as steam conditioning, where it is desired to have a downstream restriction covering several different operating conditions. However, the pressure reducers may also be used in pipe lines that have a constant operating condition.

Numerous modifications to the pressure reducers will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

I claim:

1. A pressure reducer for a pressurized pipeline, comprising:
    an outer shell having an annular sidewall and an end wall, the annular sidewall defining an interior space, a first end, and a second end, the first end defining an opening into the interior space, the annular sidewall having a first length from the first end to the second end, and the end wall disposed across the second end;
    an annular sleeve extending into the interior space from the first end of the annular sidewall, the annular sleeve having a fluid impenetrable sidewall, an inlet connected with the first end of the annular sidewall, an outlet disposed distal to the inlet within the interior space and spaced from the end wall, and a passageway extending from the inlet to the outlet, the annular sleeve extending into the interior space a second length, wherein the second length is less than the first length;
    an annular gap surrounding the annular sleeve, the annular gap disposed between the annular sidewall and the annular sleeve;
    a second gap between the end wall and the outlet of the annular sleeve;
    a first set of apertures through the end wall; and
    a second set of apertures through the annular sidewall, wherein at least a first one of the second set of apertures is located opposite the annular sleeve along the second length,
    wherein the annular sleeve is arranged to force fluid flowing through the pressure reducer to flow through the outlet of the annular sleeve, without flowing through the sidewall, before flowing through the outer shell.

2. The pressure reducer of claim 1, wherein at least a second one of the second set of apertures is located between the first aperture and the inlet.

3. The pressure reducer of claim 2, wherein the annular sleeve is attached to the annular sidewall adjacent the first end.

4. The pressure reducer of claim 3, wherein the annular sleeve comprises an annular flange surrounding the inlet, the annular flange attached to an inner surface of the annular sidewall at the first end.

5. The pressure reducer of claim 2, wherein there are no apertures through the annular sidewall between the first end and the inlet of the annular sleeve.

6. The pressure reducer of claim 1, wherein the annular sleeve is parallel with the annular sidewall.

7. The pressure reducer of claim 1, wherein the annular sleeve is radially spaced from the annular sidewall a first distance adjacent the inlet and a second distance at the outlet, wherein the second distance is larger than the first distance.

8. The pressure reducer of claim 7, wherein the annular sleeve has a tapered outer surface along the second length opposite the annular sidewall.

9. The pressure reducer of claim 1, wherein each aperture of the second set of apertures through the annular sidewall has an axis aligned orthogonal to an axis of the annular sidewall.

10. The pressure reducer of claim 1, wherein at least some apertures of the second set of apertures have axes aligned non-orthogonally to an axis of the annular sidewall.

11. A valve assembly for a pressurized pipeline, the valve assembly comprising:
a valve comprising a body defining a passage extending from a valve inlet to a valve outlet, and a flow control member adapted to selectively open and/or close the passage;
a pressure reducer operatively connected with the valve outlet, the pressure reducer comprising:
an outer shell having an annular sidewall defining an interior space and an end wall, the annular sidewall having a first end, a second end, and a first length from the first end to the second end, wherein the first end defines an opening into the interior space operatively connected with the valve outlet to receive fluid from the valve outlet, and the end wall is disposed across the second end;
an annular sleeve extending into the interior space from the first end of the annular sidewall, the annular sleeve having a fluid impenetrable sidewall, an inlet connected with the first end of the annular sidewall and an outlet located distal to the inlet and spaced from the end wall, wherein the outlet extends into the interior space a second distance from the first end of the annular sidewall, the second distance less than the first distance;
an annular gap between the annular sidewall and the annular sleeve;
an axial gap between the outlet of the annular sleeve and the end wall of the outer shell;
a first set of apertures through the end wall; and
a second set of apertures through the sidewall, wherein at least a first one of the second set of apertures is disposed opposite the annular sleeve along the second length,
wherein the annular sleeve is arranged to force fluid flowing through the pressure reducer to flow through the outlet of the annular sleeve, without flowing through the sidewall, before flowing through the outer shell.

12. The valve assembly of claim 11, wherein the valve comprises a steam conditioning valve.

13. The valve assembly of claim 12, further comprising a cooling shroud surrounding the pressure reducer and a spray-water manifold carried by the cooling shroud and arranged to spray water into a cavity in fluid communication with the pressure reducer.

14. The valve assembly of claim 11, further comprising a pipe section operatively connected with the valve outlet, wherein the pipe section surrounds and is radially spaced from the pressure reducer.

* * * * *

UNITED STATES PATENT AND TRADEMARK OFFICE
CERTIFICATE OF CORRECTION

Page 1 of 1

PATENT NO. : 8,978,706 B2
APPLICATION NO. : 13/369015
DATED : March 17, 2015
INVENTOR(S) : William V. Fitzgerald It is certified that error appears in the above-identified patent and that said Letters Patent is hereby corrected as shown below:

In the Specification:

At Column 4, line 39, "wall 64" should be -- wall 46 --.

At Column 5, line 5, "opening 64" should be -- opening 54 --.

At Column 6, line 56, "distance d2," should be -- distance d1, --.

Signed and Sealed this
Twenty-third Day of February, 2016

Michelle K. Lee
*Director of the United States Patent and Trademark Office*